United States Patent
Sid (10) Patent No.: US 7,665,483 B1
(45) Date of Patent: Feb. 23, 2010

(54) MOTORIZED SHOWER DIVERTER SYSTEM

(76) Inventor: Alberto Sid, 14 Cold Stream La., Upper Saddle River, NJ (US) 07458

( * ) Notice: Subject to any disclaimer, the term of this patent is extended or adjusted under 35 U.S.C. 154(b) by 176 days.

(21) Appl. No.: 11/923,696

(22) Filed: Oct. 25, 2007

(51) Int. Cl.
 *F16K 11/10* (2006.01)
 *A47K 3/28* (2006.01)

(52) U.S. Cl. .............. 137/625.47; 251/129.11; 4/601

(58) Field of Classification Search ........... 137/625.47; 251/129.11, 129.12; 4/567, 568, 570, 597, 4/601, 605, 615; 239/283, 446
 See application file for complete search history.

(56) References Cited

U.S. PATENT DOCUMENTS

| | | | |
|---|---|---|---|
| 1,220,704 A * | 3/1917 | Swimmer | 4/567 |
| 2,638,382 A * | 5/1953 | Evans et al. | 239/283 |
| 3,112,073 A | 11/1963 | Larson | |
| 4,842,191 A * | 6/1989 | Bergmann | 236/12.12 |
| 4,854,499 A | 8/1989 | Neuman | |
| 4,869,427 A | 9/1989 | Kawamoto | |
| 4,909,435 A | 3/1990 | Kidouchi | |
| 5,226,454 A | 7/1993 | Cabalfin | |
| 5,944,255 A | 8/1999 | Shirmohamadi | |
| 5,979,776 A | 11/1999 | Williams | |
| 6,249,922 B1 * | 6/2001 | Shimizu | 4/515 |
| 6,438,770 B1 | 8/2002 | Hed | |
| 6,446,875 B1 | 9/2002 | Brooks | |
| 6,478,285 B1 * | 11/2002 | Bergmann | 251/129.03 |
| 6,705,534 B1 | 3/2004 | Mueller | |
| 6,854,658 B1 * | 2/2005 | Houghton et al. | 236/12.12 |
| 6,859,955 B2 * | 3/2005 | Hudson | 4/601 |
| 7,299,510 B2 * | 11/2007 | Tsai | 4/601 |
| 7,356,857 B2 * | 4/2008 | Rosenberg | 4/601 |
| 7,373,954 B2 * | 5/2008 | Zhadanov et al. | 137/625.47 |
| 7,458,112 B1 * | 12/2008 | Yang | 4/601 |
| 2004/0155116 A1 | 8/2004 | Wack | |
| 2006/0075547 A1 | 4/2006 | Hamilton | |

* cited by examiner

*Primary Examiner*—John Fox
(74) *Attorney, Agent, or Firm*—Seth Natter; Natter & Natter

(57) ABSTRACT

A motorized shower water diverter valve for a handheld shower is connected to a shower water inlet pipe in lieu of a conventional showerhead. A conventional showerhead is then connected to one of two valve outlets and a hose for the handheld shower is connected to the other valve outlet. The valve may be constructed as a rotary or linear type. A motor output shaft is coupled to a gear assembly to either rotate a valve core of a rotary valve or laterally displace the core of a linear valve. The gear assembly may include a slip clutch. There is also provided a control circuit for operating the motor, a wireless remote control and a sensor for enabling the control circuit to detect the position of the valve core.

20 Claims, 8 Drawing Sheets

MOTORIZED SHOWER DIVERTER SYSTEM

BACKGROUND OF THE INVENTION

1. Field of the Invention

This invention relates generally to diverter valves for selectively coupling a shower water supply elbow to either a conventional showerhead, a hose of a handheld shower, or both.

2. Antecedents of the Invention

Diverter valves have been employed in conjunction with handheld showers to enable one to employ either a conventional fixed showerhead, a handheld shower, or both. The diverter valves were coupled to the shower water supply elbow located at an elevated level above one's head, and were inaccessible to many handicapped individuals. Thus, a person who was unable to reach a diverter valve, but who was capable of showering by oneself utilizing a handheld shower, required assistance in operating the diverter valve. Further, persons who were of sufficient height to access a diverter valve, but were incapacitated due to limited strength, nerve damage, etc. were unable to manipulate the valve.

SUMMARY OF THE INVENTION

A remote controlled motorized shower diverter valve system includes a rotary or linear type valve having an inlet coupled to a shower water supply elbow and a pair of outlets. One outlet is coupled to a conventional showerhead and the other, to an auxiliary shower, e.g. a hose of a handheld shower.

The system includes a power supply, a micro-controller, a remote control signal transmitter and receiver, a motor and a gear assembly having a slip clutch. The gear assembly is coupled to a rotary valve core by a spider link. The spider link includes a gear assembly coupling, driven by an output shaft of the gear assembly, and a valve core coupling, which is fixed to a stem of the valve core. The couplings have axially projecting opposed legs, with the legs of one coupling nested between the legs of the other coupling.

The motor coupling includes a cylindrical control surface having a plurality of spaced lands or actuators which engage one or more snap action, optical or magnetic switches which are in communication with the micro-controller for sensing the position of the valve core to enable the micro-controller to accurately position the valve core and for assuring that the motor stops at the end of valve core travel.

From the foregoing compendium, it will be appreciated that an aspect of the present invention is to provide a motorized shower diverter system of the general character described which is not subject to the disadvantages of the antecedents of the invention aforementioned.

It is a feature of the present invention to provide a motorized shower diverter system of the general character described well suited for persons with disabilities.

It is a consideration of the present invention to provide a motorized shower diverter system of the general character described which is relatively low in cost.

It is another aspect of the present invention to provide a motorized shower diverter system of the general character described with extended motor life.

A further feature of the present invention is to provide a motorized shower diverter system of the general character described which is safe for operation in wet environments.

A still further consideration of the present invention is to provide a motorized shower diverter system of the general character described which is relatively simple to use.

A further aspect of the present invention is to provide a motorized shower diverter system of the general character described having low power consumption.

A further feature of the present invention is to provide a motorized shower diverter system of the general character described with sustained reliability over long periods of usage.

Further aspects, features and considerations of the present invention in part will be obvious and in part will be pointed out hereinafter.

With these ends in view, the invention finds embodiment in certain combinations of elements, arrangements of parts and series of steps by which the aspects, features and considerations aforementioned and certain other aspects, features and considerations are hereinafter attained, all as fully described with reference to the accompanying drawings and the scope of which will be more particularly pointed out and indicated in the appended claims.

BRIEF DESCRIPTION OF THE DRAWINGS

In the accompany drawings in which are shown some of the various possible exemplary embodiments of the invention.

DESCRIPTION OF THE PREFERRED EMBODIMENTS

Referring now in detail to the drawings, the reference numeral 10 denotes generally a motorized shower diverter assembly constructed in accordance with and embodying the invention. The diverter assembly 10 includes a valve housing 12 and a drive housing 14. The valve housing 12 encases a rotary shower diverter core, such as that disclosed in U.S. Pat. No. 3,112,073 or U.S. Patent Application Publication 2006/0242759 A1, both of which are incorporated herein by reference.

Accordingly, the valve housing 12 includes an internally threaded inlet 16, configured to be coupled to a shower water supply elbow, and a pair of threaded outlet ports 18, 20. It should be understood that the outlet port 18 may be connected to a fixed showerhead while the outlet port 20 may be connected to a hose of a handheld shower.

Figure 4:
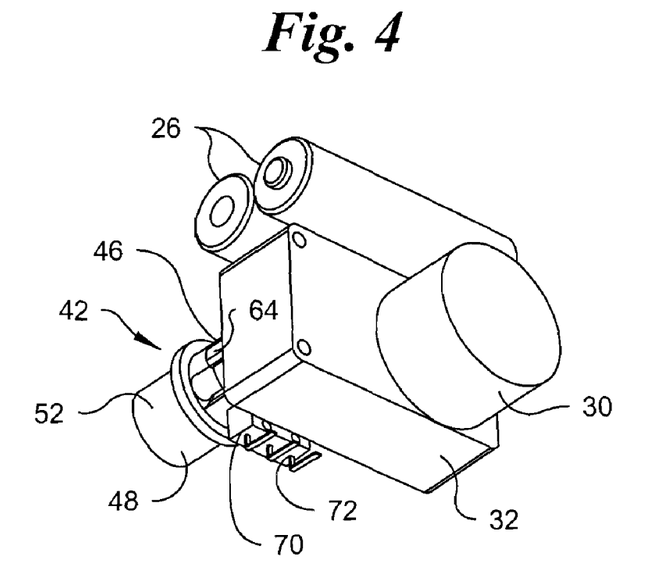
FIG. 4 is a perspective view of the motor and gear box, with the housing omitted, and showing a power supply comprising a pair of batteries and a spider link having a motor coupling which includes spaced lands for actuating the snap action switches.

The drive housing 14 is configured with a battery compartment 22, which is accessed through a lid 24, and which carries a power supply 26, such as a pair of batteries illustrated in FIG. 4.

Figure 1:
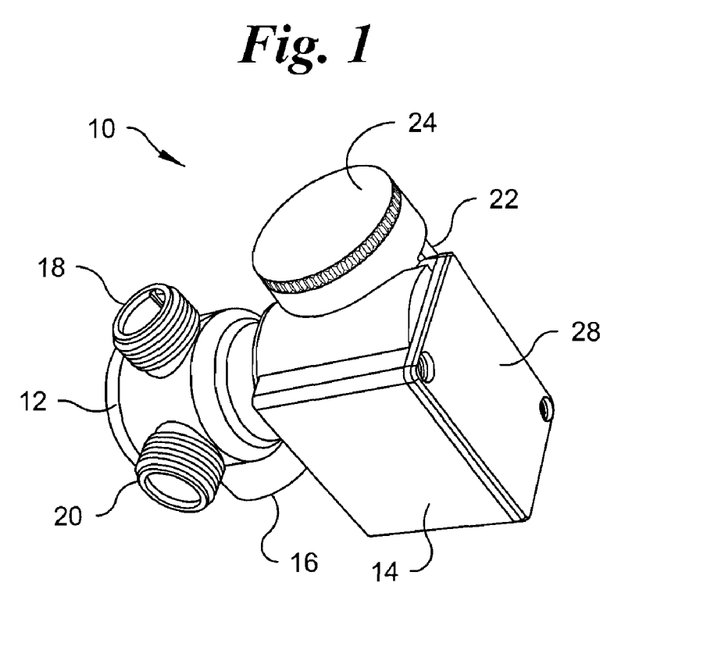
FIG. 1 is a front perspective view of a motorized shower diverter constructed in accordance with and embodying the invention and illustrating the underside of a drive housing, a battery compartment and a rotary diverter valve housing, with the valve housing having an inlet and two outlet ports.
Figure 2:
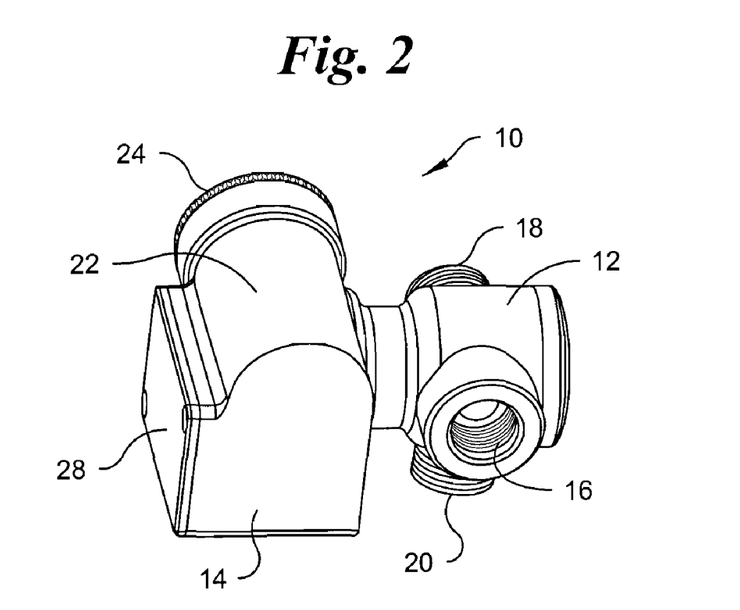
FIG. 2 is a rear perspective view of the motorized shower diverter, better illustrating the rotary valve housing inlet.
Figure 3:
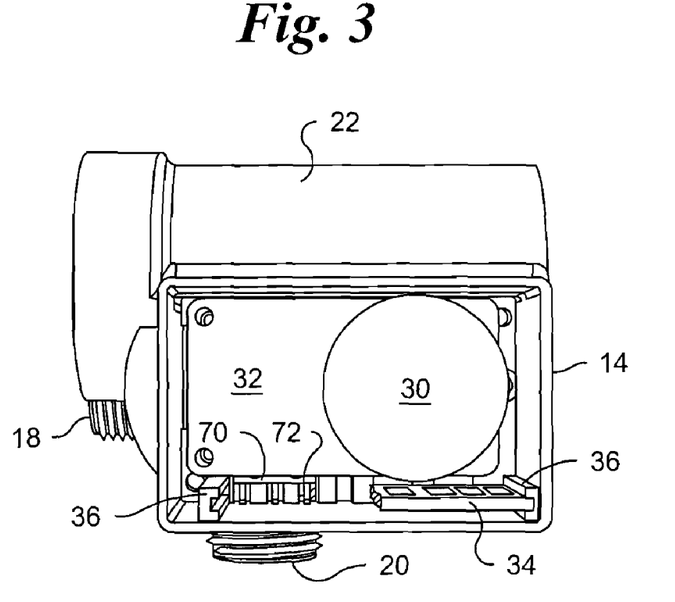
FIG. 3 is an enlarged scale side elevational view of the drive housing, with an access panel removed, and showing a motor, a gear box which houses a gear assembly, a fragmentary portion of a micro-controller board and a pair of snap action switches.

It should be noted that the drive housing 14 includes an access panel 28 which has been removed in FIG. 3 to illustrate a motor 30 and a gear box 32, as well as a micro-controller 34 (illustrated with a left portion broken away) and which is carried between a pair of channel brackets 36.

Figure 8:
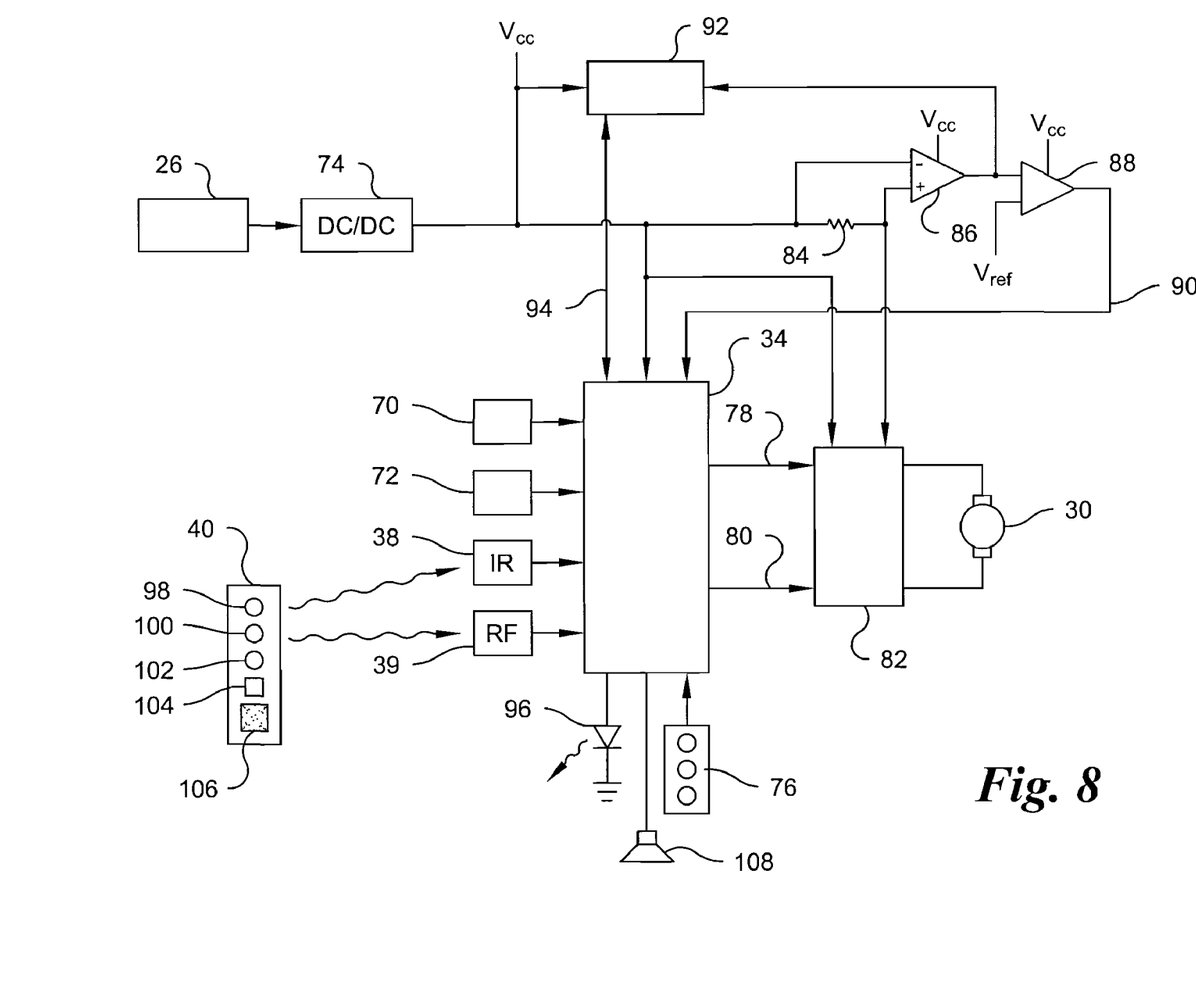
FIG. 8 is a schematized block diagram illustrating components of the motorized shower diverter system.

Coupled to the micro-controller 34 is one or more remote control signal receivers 38, 39 which are responsive to wireless signals, e.g. IR or RF command signals, transmitted from a wireless remote control 40 (all of which are depicted in FIG. 8).

The gear box 32 houses a reduction gear assembly which is driven by an output shaft of the motor 30. Among the gear trains which may be employed in the gear assembly are a spur gear fixed to the motor output shaft engaging an internal gear of the gear assembly for driving further gears or a worm on the motor output shaft engaging a worm gear of the gear assembly for driving further gears. A slip clutch is provided within the gear assembly to avoid stalling the motor 30, e.g. if the micro-controller 34 fails to stop the motor at the end of valve core travel.

Figure 5:
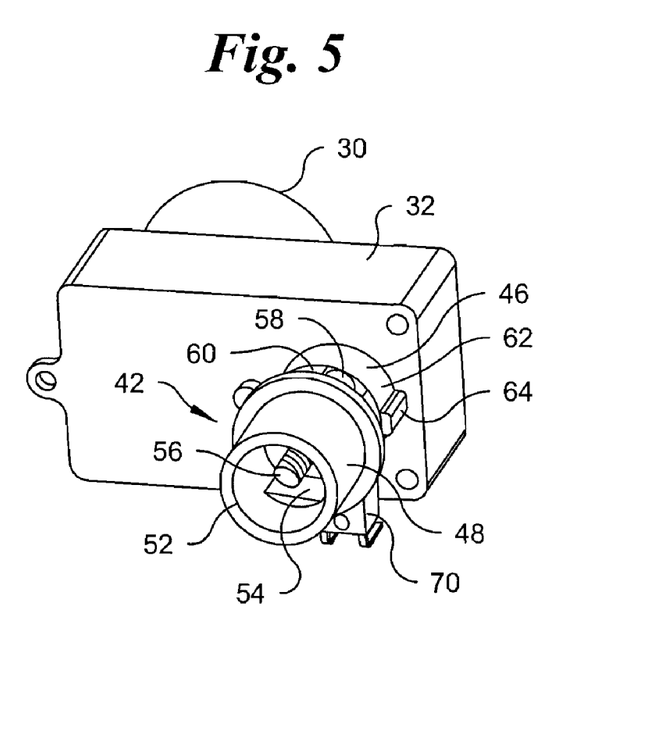
FIG. 5 is a rear perspective view of the gearbox, better illustrating the spider link.
Figure 6:
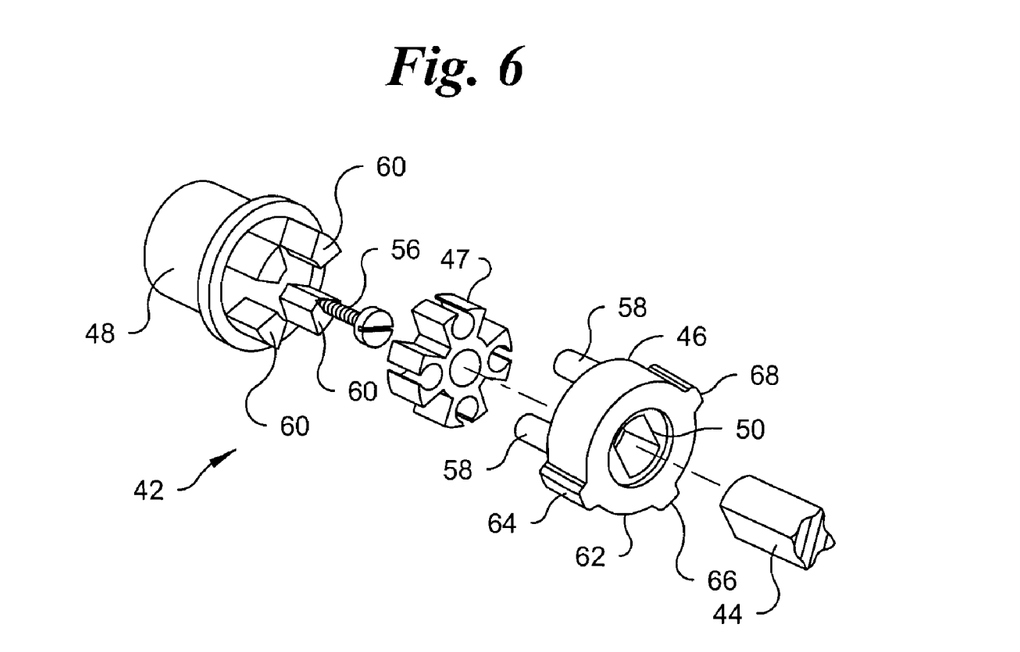
FIG. 6 is an enlarged scale perspective exploded view of the spider link, better illustrating three lands positioned on a cylindrical control surface of the motor coupling.

A spider link 42, illustrated in FIG. 4, FIG. 5 and FIG. 6, interconnects a noncircular output shaft 44 of the gear assembly for controlled rotation of the valve core. As illustrated in FIG. 6, the spider link 42 includes a gear assembly coupling 46, a flexible spider 47 and a valve core coupling 48. With reference to FIG. 6, it will be seen that the gear assembly coupling 46 includes a noncircular aperture 50 which is engaged by the noncircular output shaft 44. The valve core coupling 48 includes a cylindrical socket 52 which receives a valve core stem (not shown). The socket 52 includes at least one flat 54, illustrated in FIG. 5, which engages a mating noncircular surface of the valve core stem.

With reference to FIG. 5 and FIG. 6, it will be noted that the valve core coupling 48 includes an axial screw 56 which serves to secure the valve core stem within the cylindrical socket 52. Accordingly, the threaded portion of the screw 56 engages a registered threaded aperture of the valve core stem.

It should also be noted that the gear assembly coupling 46 includes a plurality of spaced legs 58 which project axially toward the valve core coupling 48. Similarly, the valve core coupling 48 includes a plurality of spaced legs 60 which project axially toward the gear assembly coupling 46.

The legs 58 seat in oversized spaces between the legs 60, while the legs 60 seat in oversized spaces between the legs 58. Radially projecting arms of the flexible spider 47 nest between each leg 58 and its adjacent leg 60, such that rotation of the gear assembly output shaft 44 is transmitted through the spider link 42 to rotate the valve core without backlash.

As illustrated in FIG. 6, the gear assembly coupling 46 includes a control surface 62 having a plurality of spaced actuators comprising radially projecting lands, 64, 66, 68. The lands are positioned to contact and trip one or more spaced snap action switches 70, 72 which are fixed relative to the gear box 32 and enable the micro-controller 34 to detect or sense the position of the valve core. It should be evident that the position of the valve core may be equally detected by any other type of sensing device, e.g. magnetic or optical sensors, etc.

Since the snap action switches are fixed relative to the gear box 32, rotation of the gear box output shaft 44, hence rotation of the gear assembly coupling 46, brings one or more of the lands 64, 66, 68 into contact with the switches 70, 72.

The land 64 illustrated in FIG. 5 may reference a "home" position which coincides with a limit stop of the rotary valve core when registered with the snap action switch 70. Thus, when the switch 70 is tripped by the land 64, the micro-controller 34 detects the end of travel of the valve core, i.e. a mechanical stop.

The micro-controller 34 thereafter controls the motor such that the output shaft 44, hence the spider link 42 and the valve core, will only rotate in an opposite direction. The sequential tripping of the switches 72 and/or 70 by the lands 66, 68 during counterclockwise rotation is sensed by the micro-controller 34 and is employed to stop rotation of the valve core at selected positions for controlling water flow to either or both outlet ports 18, 20. It should also be noted that when the snap action switch 70 is tripped by the land 68, the micro-controller will recognize that the valve core has reached the end of travel in the counterclockwise direction and thereafter controls the motor to rotate only in the clockwise direction.

Figure 7:
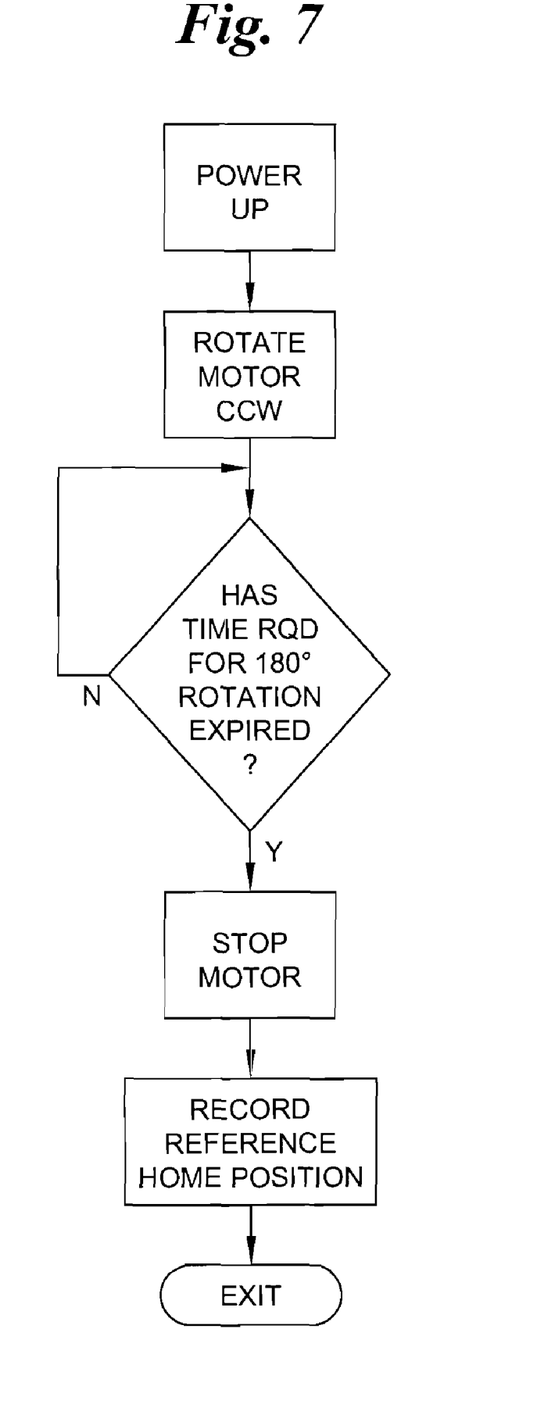
FIG. 7 is a flow chart illustrating a micro-controller power up routine.

When the diverter 10 is initially powered up or when the batteries are replaced, the micro-controller 34 enters a start up routine depicted in FIG. 7. The micro-controller 34 actuates the motor 30 such that the gear assembly output shaft 44 rotates in a clockwise direction (as viewed in FIG. 5) for a time duration sufficient to rotate the valve core 1800 until the land 64 is registered with the snap action switch 70, constituting final "home" valve core position. When the final valve core position is reached, the valve core has reached its mechanical stop and no longer rotates. The slip clutch within the gear assembly permits continued rotation of the motor however, until the time duration for 180° of rotation has expired. The micro-controller 34 then registers the final position as the "home" position for controlling further rotation of the valve core in response to command signals.

A schematized block diagram of the system in accordance with the present invention is illustrated in FIG. 8. To power the system, the power supply 26, such as a battery is provided. Alternately, electrical power can be supplied from a turbine type voltage generator powered by water flow. The output of the power supply 26 is fed to a DC/DC converter 74, e.g. a voltage regulator, which boosts the supply voltage and maintains the voltage at a reference level for operation of control circuitry as well as the motor 30.

Command signals from either the receiver 38 (which receives IR signals) or the receiver 39 (which receives RF signals), as the case may be, are transmitted from the remote control 40 and are applied at input ports of the micro-controller 34. Similarly, the status of the snap action switches 70, 72 are received as inputs to the micro-controller 34. It should also be noted that a local hardwired keypad 76 may be provided as a source of command signals. The keypad 76 may be incorporated in or may be attached to the drive housing 14.

The micro-controller 34 is normally set in a sleep or standby mode for power conservation. When a command signal is received from the IR remote control receiver 38, the RF receiver 39, or the keypad 76, the micro-controller 34 decodes the incoming command signal and rotates the motor until the selected diverter valve core position is reached. Once the valve core has been positioned, the micro-controller 34 reenters the standby or sleep mode. The micro-controller 34 generates a clockwise rotation output signal on a line 78 and a counterclockwise rotation output signal on a line 80. The signals appearing on the lines 78, 80 are received at a stepper or "H" bridge 82 for driving the motor 30. The stepper or "H" bridge may comprise an integrated circuit module, such as a National Semiconductor Dual Bridge Motor Driver L-293 or may be constructed using transistors and discrete components. The stepper or "H" bridge 82 then drives the motor 30 in a clockwise direction, a counterclockwise direction, holds the motor fixed, or permits the motor output shaft to turn manually, as will be described hereinafter.

For example, with a low signal appearing on both lines 78 and 80, the stepper or "H" bridge will lock the motor in its position, without the motor consuming any power. With a high signal on both lines 78 and 80, the stepper or "H" bridge places the motor 30 in a freewheeling state, so that it can be manually turned. With a low signal on the line 78 and with a high signal on the line 80, the motor is driven in a counterclockwise direction, while a high signal on the line 78 and a low signal on the line 80 results in the motor 30 being driven in a clockwise direction.

The current consumed by the motor 30 is monitored through a low resistance value resistor 84. A differential amplifier 86 amplifies the voltage drop across the resistor 84 and it is compared at a comparator 88 with a reference value. If the voltage drop across the resistor 84 exceeds a threshold reference value, the comparator 88 generates a signal indicative of excessive current usage by the motor, which signal is transmitted along a line 90 to the micro-controller 34.

An alternate manner of generating a signal indicating excessive current usage by the motor 30 is to employ an analog to digital converter 92 to monitor the output voltage from the differential amplifier 86. The analog to digital converter receives the output signal of the differential amplifier 86 as well as the regulated voltage from the DC/DC converter 74 and generates an output signal which is received at the micro-controller 34 through a line 94. The micro-controller 34 can thus monitor both motor current and the output voltage of the converter 74 to detect low battery states, a stalled motor, etc.

There is additionally provided a status LED 96 which generates continuous illumination to indicate a satisfactory battery condition and a flashing signal to indicate either a stalled motor, improper positioning of the valve core or other condition which requires attention. To conserve power, the LED 96 may be actuated only periodically.

The motor 30 may comprise a stepper motor, which is an open loop type motor. If a stepper motor is utilized, the gear assembly need not include a slip clutch, since a stepper motor can be stalled without mechanical or electrical damage.

Figure 9:
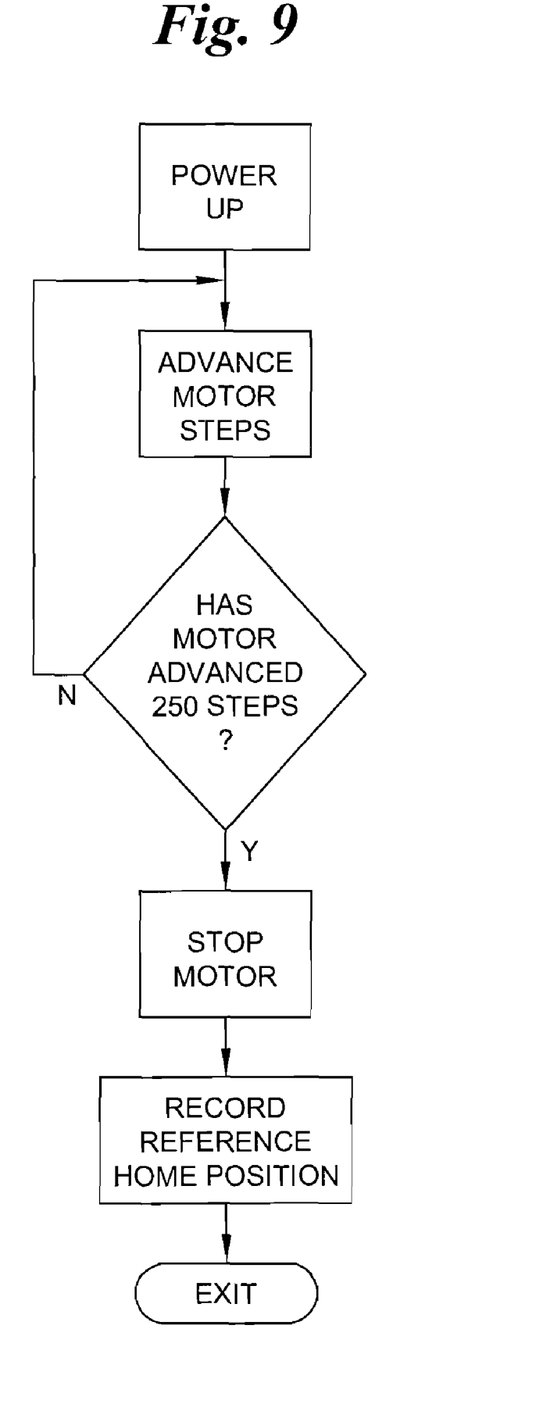
FIG. 9 is a flow chart illustrating a micro-controller power up routine when a stepper motor is employed.

The employment of a stepper motor also simplifies the micro-controller routine for determining the "home" position upon initial startup or replacement of batteries. FIG. 9 illustrates a flow chart for determining home position with a stepper motor.

If full valve core rotation, i.e. 180° of rotation, is equivalent to 200 steps, the stepper motor is actuated to provide more than 200 steps, e.g. 250 steps. After the stepper motor is advanced 250 steps, one is certain that the mechanical stop end of travel of the valve core has been reached and that the home position has been attained.

Thereafter, the stepper motor can be advanced any specific number of steps in the opposite direction and the micro-controller 34 will know the exact position of the valve core. For example, if the stepper motor is advanced 100 steps from the home position, the diverter valve core will be at its mechanical center position, i.e. 90° of rotation.

Referring again to FIG. 8, wherein the remote transmitter 40 is illustrated, the remote transmitter includes push button or membrane switches 98, 100 and 102 for positioning the diverter valve for water flow through the showerhead, the showerhead and the handheld shower or the handheld shower only. There is additionally provided a fourth push button switch 104 comprising a panic switch which actuates an internal buzzer or alarm 106 as well as a remote alarm annunciator 108 (positioned elsewhere in the premises) for alerting others of the existence of an emergency and the need for assistance at the shower. Cancellation of the alarm signal requires the depression of a combination of push buttons, e.g. depressing buttons 98 and 102 simultaneously.

It should be appreciated that the present invention may be employed with a valve housing and rotary valve core which does not include end of rotation limit stops. In such instance, the motor 30 need not reverse direction, thereby avoiding the necessity of providing an "H" bridge in the motor control circuit and a slip clutch in the gear assembly.

Since the actuator lands 64, 66, 68 are positioned at 90° rotation intervals from each other, actuation of the snap action switch 70 by successive lands during rotation in only one direction generates pulses at predetermined time intervals which are functions of the speed of motor rotation. With constant motor speed, the time interval for rotation between the land 64 and the land 68, (corresponding to 180° of valve core rotation), will be twice the time interval for rotation between the lands 64 and 66, or between the lands 66 and 68. By detecting the end of the longer (180°) rotation time interval, the micro-controller 34 references the location of the home position.

The micro-controller 34 can be programmed to open a time window ($T_x$) greater than a 90° valve rotation time window but less than a 180° valve rotation time window every time the snap action switch 70 is actuated, i.e. a retriggerable time window. If, within the time window $T_x$, the micro-controller senses a second actuation of the switch 70, the micro-controller will recognize that the valve core is at a position coinciding with the land 66 or the land 68. Rotation is continued until the time window $T_x$, times out without the switch 70 being actuated. The motor rotation is continued until the switch 70 is actuated, which now indicates that the home position has been reached.

Figure 10:
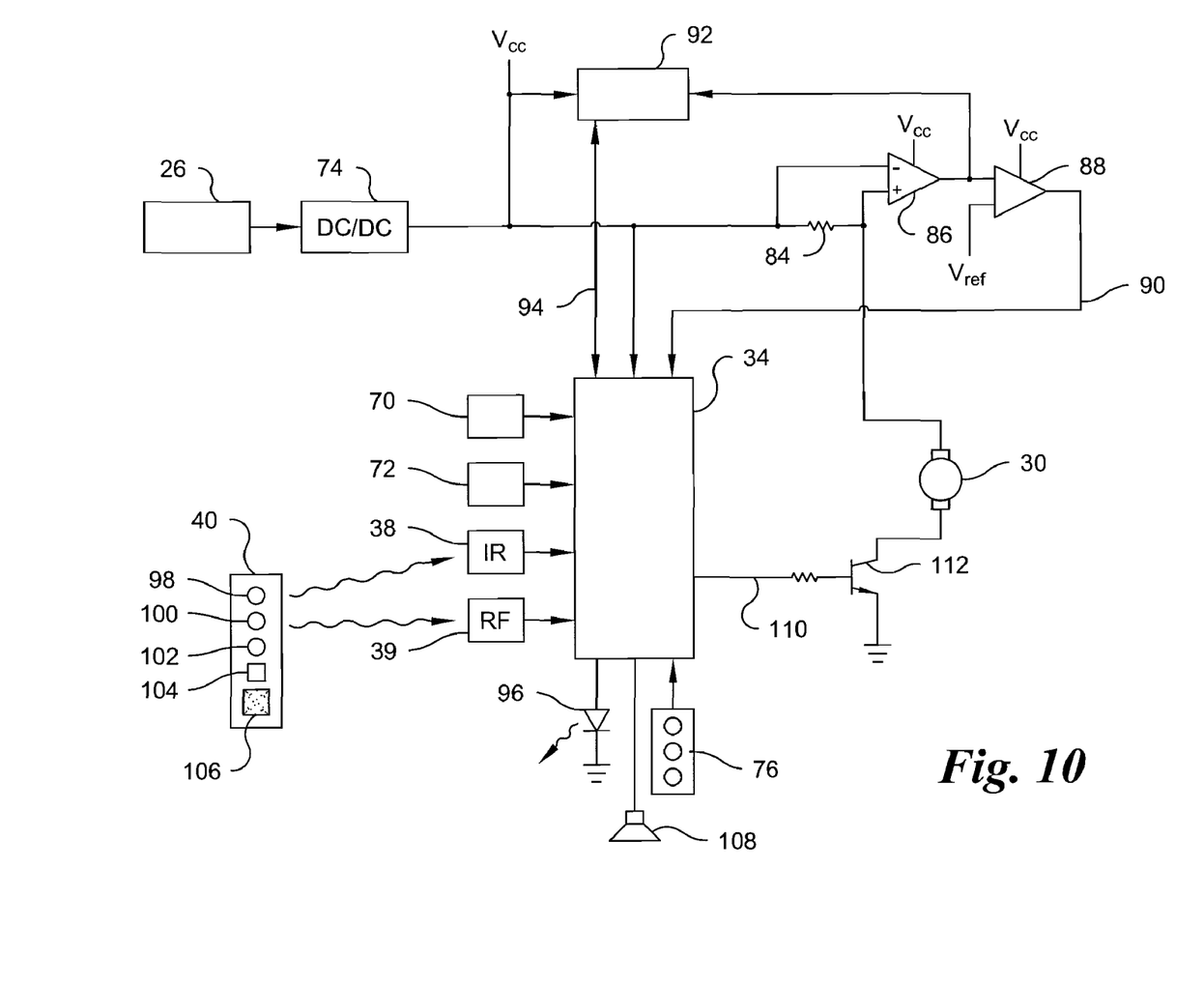
FIG. 10 is a schematized block diagram illustrating a control circuit for motor rotation in only one direction.

In FIG. 10, a schematized block diagram illustrating a typical control circuit for driving the motor 30 for rotation in only one direction is illustrated. It should be noted that the control circuit does not employ the stepper or "H" bridge 82. To turn the motor on, the micro-controller generates a high output signal on a line 110 which appears at the base of a transistor 112. A low signal on the line 110 switches of the transistor 112 off, whereby the motor is no longer energized.

Due to the inertia of valve core rotation, as well as inertia of the motor 30 and the gear assembly, the valve core may have a tendency to coast when power to the motor is turned off. Such coasting may result in misalignment of the valve core.

Such valve core misalignment may be corrected by slightly altering the position of the actuator lands 64, 66, 68 relative to the position of the valve core stem. An alternate arrangement for avoiding coasting of the motor and valve core is to employ an H bridge as in FIG. 8 or an electromechanical braking circuit 114, which is depicted in FIG. 11.

Figure 11:
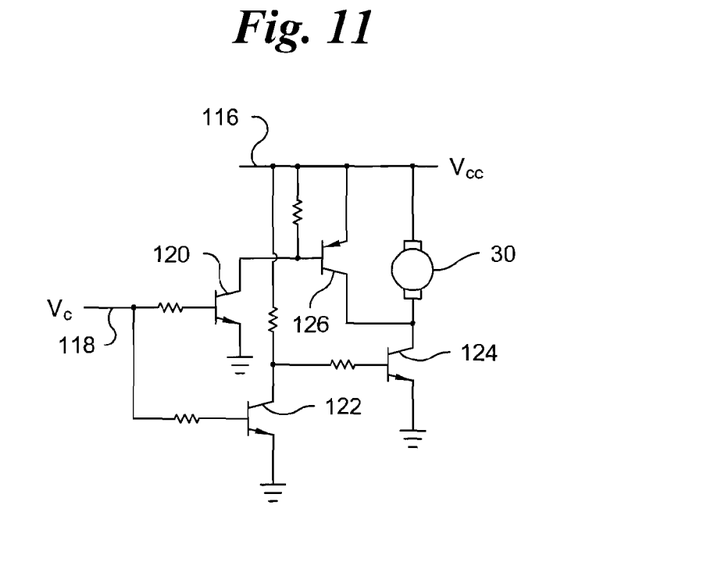
FIG. 11 is a circuit diagram for reversing motor rotation direction and electromechanical motor braking.

It will be seen in FIG. 11 that the motor voltage appears on a line 116, while a control voltage appears on a line 118.

When the control voltage on line 118 is high, a pair of transistors, 120, 122 are saturated into full conduction. As a result, the base of a transistor 124 is at a relatively low potential and the transistor 124 is not in a conductive state such that the motor 30 will no longer be powered. The base of a further transistor 126 is also at a low potential, such that the transistor 126 is in a conductive state, shorting both leads of the motor 30 and providing an electromechanical brake which stops the motor from turning or coasting.

When the control voltage on line 118 is low, the transistors 120, 122 will be in a nonconductive state, the base of the transistor 126 will be at a high potential such that the transistor 126 is in a nonconductive state, whereby the motor leads will no longer be shorted out. The motor 30 will thus be allowed to spin freely. Additionally, the base of the transistor 124 will be put at a relative high potential to switch the motor on.

Figure 12:
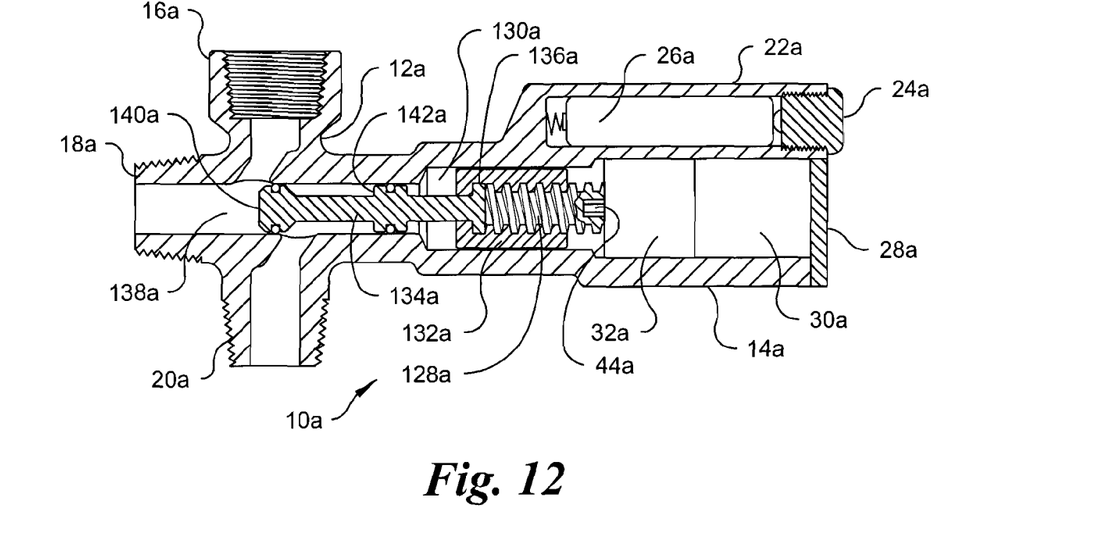
FIG. 12 is a longitudinal sectional view through an alternate embodiment wherein the linear rather than rotary diverter valve is employed.

A further embodiment of the invention, wherein a motorized shower diverter assembly 10a comprises a linear, rather than rotary, diverter valve is depicted in FIG. 12. In this alternate embodiment, like numerals will be employed with reference to corresponding components of the previous embodiment, however, bearing the suffix "a".

The shower diverter assembly 10a includes a valve housing 12a and a drive housing 14a. The valve housing includes an inlet 16a and a pair of outlets 18a, 20a. In a manner similar to that of the previous embodiment, the drive housing 14a includes a battery compartment 22a having a lid 24a. The battery compartment 22a houses one or more batteries 26a.

An access panel 28a of the drive housing 14a is provided to access a motor 30a and a gear box 32a. In a manner similar to that of the previous embodiment, the drive housing 14a also carries a micro-controller and one or more receivers for receiving command signals generated by a remote transmitter.

An output shaft 44a of a gear assembly carried in the gear box 32a is fixed to lead screw 128a which, when driven by the motor 30a, rotates within a chamber 130a. The lead screw 128a engages a follower 132a which is free to move axially within the chamber 130a but which is fixed against rotation, such that rotation of the output shaft 44a, hence rotation of the lead screw 128a, causes the follower to translate back and forth within the chamber 130a as a function of the direction of rotation of the motor 30a. A valve core or piston 134a includes an enlarged head 136a seated within the follower 132a such that the valve core 134a moves linearly back and forth when the follower moves linearly back and forth.

The valve core 134a extends into a cylindrical flow channel 138a of the valve housing 12a and includes a pair of annular flanges 140a, 142a having flexible seals for sealing against the internal periphery of the channel 138a.

From an observation of FIG. 12, it should be noted that the linear position of the valve core within the flow channel 138a determines the flow path for water from the inlet 16a to either or both of the outlets 18a, 20a.

In the position illustrated in FIG. 12, shower water flows from the inlet 16a to the outlet 18a. If the valve core is advanced to the left, water will flow from the inlet 16a to the outlet 20a and will be sealed against flow through the outlet 18a. If advanced further to the left water will flow from the inlet 16a to both outlets 18a and 20a.

It should also be noted that a plurality of linearly positioned actuator lands may be provided on the periphery of the follower and one or more snap action switches may be positioned within the chamber 130a to enable the micro-controller to detect the position of the valve core and to reference a home position.

Figure 13:
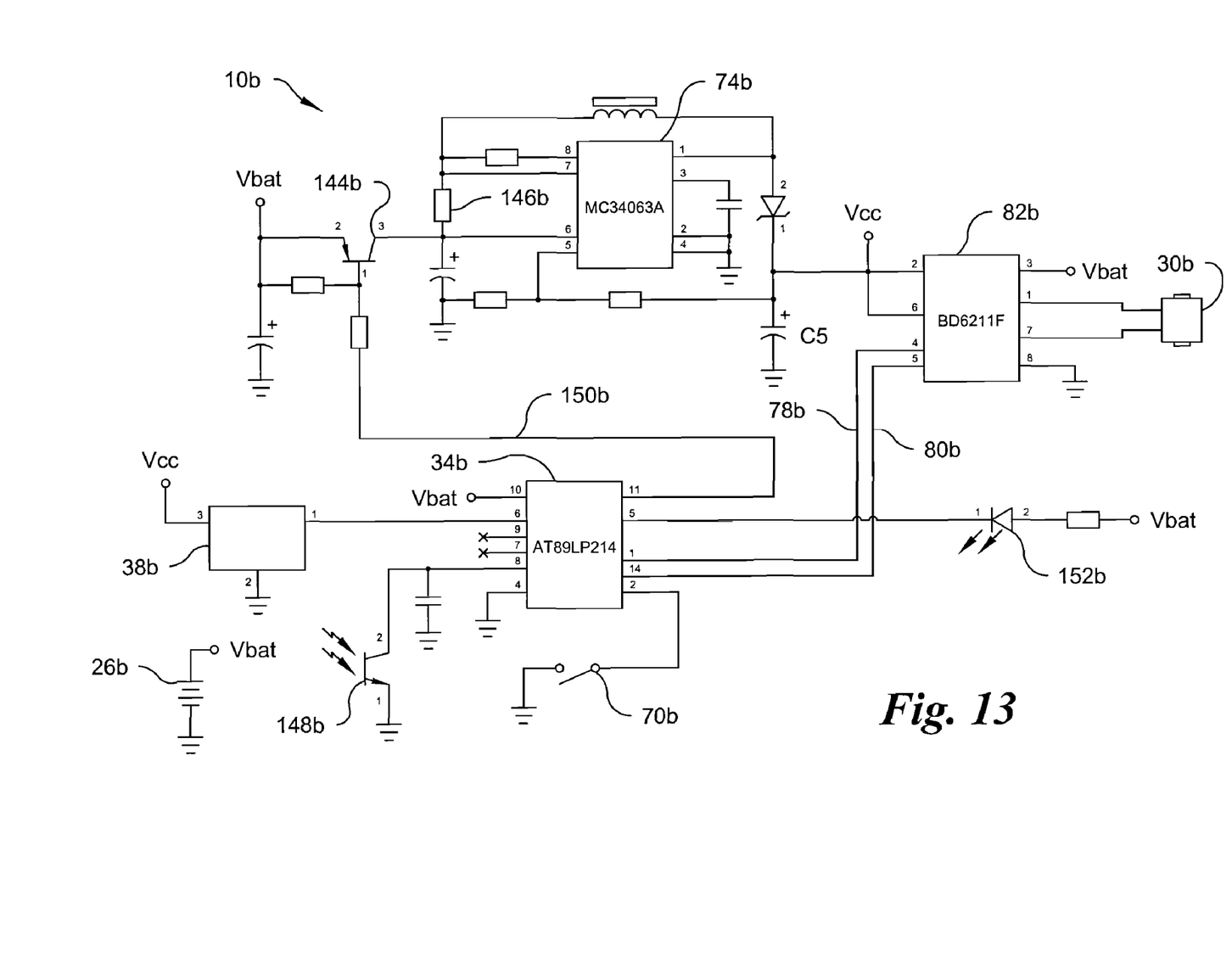
FIG. 13 is a schematic illustration, similar to FIG. 8, and illustrating a further circuit embodiment with component details.

Referring now to FIG. 13 wherein a schematic diagram of a motorized shower diverter assembly 10b is shown, it should be understood that like numerals will be employed with reference to corresponding components of the previous embodiments, however bearing the suffix "b".

The shower diverter assembly 10b includes components similar to those previously employed as illustrated in FIG. 8, however, without the necessity of the analog to digital converter 92 for monitoring motor current.

Power is supplied from a power supply 26b through a switching transistor 144b to a DC/DC converter 74b which may comprise an MC34063A step-up/down/inverting switching regulator available from Semiconductor Components Industries. The value of a resistor 146b is selected to provide an appropriate limit on current output to an H-bridge 82b for controlling a motor 30b. The H-bridge motor controller may comprise a Rohm BD6211F integrated circuit.

A micro-controller 34b, such as an Amtel AT89LP214 micro-controller, is normally maintained in a sleep mode for power conservation. Upon receiving an interrupt signal from an optodetector 148b, which senses an initial signal from a wireless infrared remote control, the micro-controller switches the switching transistor 144b through a control line 150b to power up the DC/DC converter. The DC/DC converter then establishes the voltage $V_{cc}$, which powers an infrared receiver 38b. The infrared receiver 38b receives the transmitted command signals which are input to the micro-controller 34b.

As with the prior embodiment, the micro-controller 34b decodes the command signals and generates control signals to the H-bridge 82b which are transmitted through a pair of output signal lines 78b, 80b. The micro-controller 34b monitors the position of the valve core as a result of signals received from a switch 70b.

There is also provided an LED 152b which may be illuminated to generate status signals, such as a low battery signal and/or signals to indicate a receipt or processing of control signals.

Thus it will be seen that there is provided a motorized shower diverter system which achieves the various aspects, features and considerations of the present invention and which is well adapted to meet the conditions of practical usage.

As various possible further embodiments might be made of the present invention and as various changes might be made in the illustrative embodiment set forth herein without department from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A motorized shower diverter system for controlling water flow between a water supply elbow and a fixed showerhead or an alternate shower, the system comprising a diverter valve having a valve housing, the valve housing including an inlet for coupling to the water supply elbow, a first outlet for coupling to the fixed showerhead and a second outlet for coupling to the alternate shower, the diverter valve having a core movable within the housing from a first position, wherein a water flow path is provided between the inlet and the first outlet and a second position, wherein a water flow path is provided between the inlet and the second outlet, the system further including a motor having an output shaft and a gear assembly operatively connected to the output shaft and to the valve core for moving the valve core between the first position and the second position.

2. A motorized shower diverter system as constructed in accordance with claim 1 further including a wireless remote control operatively connected to the motor.

3. A motorized shower diverter system as constructed in accordance with claim 2 wherein the wireless remote control includes a first command switch for generating a command signal for providing a water flow path between the inlet and the first outlet, a second command switch for generating a command signal for providing a water flow path between the inlet and the second outlet and a panic switch for generating an audible distress signal.

4. A method of controlling water flow between a fixed showerhead and a handheld shower employing a motorized shower diverter system constructed in accordance with claim 2 wherein the wireless remote control includes a first command switch for generating a command signal for providing a water flow path between the inlet and the first outlet and a second command switch for generating a command signal for providing a water flow path between the inlet and the second outlet, the method comprising the steps of:
   a) connecting a showerhead to the first outlet,
   b) connecting a hose of the handheld shower to the second outlet, and
   c) actuating a command switch corresponding to a desired water flow path.

5. A motorized shower diverter system as constructed in accordance with claim 1 further including a control circuit, the control circuit comprising a micro-controller, the micro-controller being operatively connected to the motor for controlling rotation of the motor output shaft.

6. A motorized shower diverter system as constructed in accordance with claim 5 further including at least one actuator which moves with the core and at least one sensor fixed with respect to the core, the at least one sensor being selectively engaged by the at least one the actuator, the at least one sensor being operatively connected to the micro-controller, whereby the micro-controller determines the position of the movable core.

7. A motorized shower diverter system as constructed in accordance with claim 6 further including a plurality of actuators which move with the core and which selectively engage the at least one sensor.

8. A motorized shower diverter system as constructed in accordance with claim 6 further including a wireless remote control, the control circuit including at least one receiver for receiving command signals transmitted by the remote control, the at least one receiver being operatively connected to the micro-controller, the micro-controller receiving a command signal from the at least one receiver and in response thereto, actuating the motor to move the valve core to a position corresponding to that of the command signal.

9. A motorized shower diverter system as constructed in accordance with claim 8 wherein the motor comprises a stepper motor, and the micro-controller actuates the motor for a predetermined number of steps.

10. A motorized shower diverter system as constructed in accordance with claim 1 further including a link interconnecting the gear assembly and the valve core, the link comprising a driver coupling, the driver coupling being driven by the gear assembly and a core coupling, the core coupling being fixed to the valve core, the driver coupling engaging the core coupling for rotation about a common axis.

11. A motorized shower diverter system as constructed in accordance with claim 10 wherein the link comprises a spider link.

12. A motorized shower diverter system as constructed in accordance with claim 1 wherein the diverter valve includes a core movement limit stop and the gear assembly including a slip clutch, whereby the motor may continue to operate without damage after the core has engaged the limit stop.

13. A motorized shower diverter system as constructed in accordance with claim 1 wherein the valve core is movable within the housing to a third position, wherein a water flow path is provided between the inlet, the first outlet and the second outlet.

14. A motorized shower diverter system as constructed in accordance with claim 13 wherein the command signal source comprises a keypad.

15. A motorized shower diverter system for controlling water flow between a water supply elbow and a fixed showerhead or an alternate shower, the system comprising a diverter valve having a valve housing, the valve housing including an inlet for coupling to the water supply elbow, a first outlet for coupling to the fixed showerhead and a second outlet for coupling to the alternate shower, the diverter valve having a core movable within the housing from a first position, wherein a water flow path is provided between the inlet and the first outlet and a second position, wherein a water flow path is provided between the inlet and the second outlet, the system further including a motor operatively connected to the valve core for moving the valve core between the first position and the second position, a wireless remote control for transmitting a command signal indicative of a desired water flow path and a control circuit, the control circuit receiving the command signal and in response thereto, driving the motor to move the valve core to a position corresponding with the desired water flow path.

16. A motorized shower diverter system as constructed in accordance with claim 15 further including at least one actuator which moves with the core and at least one sensor fixed with respect to the core, the at least one sensor being selectively engaged by the at least one, actuator, the at least one sensor being operatively connected to the control circuit for determining the position of the core.

17. A motorized shower diverter system as constructed in accordance with claim 15 wherein the diverter valve includes a core movement limit stop, the system including a slip clutch positioned intermediate the motor and the valve core, whereby the motor may continue to operate without damage after the core has engaged the limit stop.

18. A motorized shower diverter system for controlling water flow between a water supply elbow and a fixed showerhead or an alternate shower, the system comprising a diverter valve having a valve housing, the valve housing including an inlet for coupling to the water supply elbow, a first outlet for coupling to the fixed showerhead and a second outlet for coupling to the alternate shower, the diverter valve having a core movable within the housing from a first position, wherein a water flow path is provided between the inlet and the first outlet and a second position, wherein a water flow path is provided between the inlet and the second outlet, the system further including a motor operatively connected to the valve core for moving the valve core between the first position and the second position, a programmable micro-controller, a sensor for sensing the position of the valve core and a command signal source for generating a command signal indicative of a desired water flow path, the sensor and the command signal source being operatively connected to the micro-controller, the micro-controller receiving a sensor signal and in response thereto, ascertaining the position of the valve core, the micro-controller receiving the command signal and in response thereto, driving the motor to move the valve core to a position corresponding with the desired water flow path.

19. A motorized shower diverter system as constructed in accordance with claim 18 wherein then command signal source comprises a wireless transmitter.

20. A motorized shower diverter system as constructed in accordance with claim 19 wherein the wireless transmitter includes a panic switch for generating an audible distress signal.

* * * * *